US006853107B2

(12) United States Patent
Pyntikov et al.

(10) Patent No.: US 6,853,107 B2
(45) Date of Patent: Feb. 8, 2005

(54) MULTIPHASE MOTOR HAVING DIFFERENT WINDING CONFIGURATIONS FOR RESPECTIVE SPEED RANGES

(75) Inventors: Alexander Pyntikov, Ashburn, VA (US); Boris A. Maslov, Reston, VA (US); Alexander A. Gladkov, Fairfax, VA (US)

(73) Assignee: Wavecrest Laboratories, LLC, Dulles, VA (US)

(*) Notice: Subject to any disclaimer, the term of this patent is extended or adjusted under 35 U.S.C. 154(b) by 33 days.

(21) Appl. No.: 10/396,482

(22) Filed: Mar. 26, 2003

(65) Prior Publication Data

US 2004/0189242 A1 Sep. 30, 2004

(51) Int. Cl.[7] .................................................. H02K 1/00
(52) U.S. Cl. ....................... 310/184; 310/179; 310/189; 818/720; 818/254
(58) Field of Search ................................ 310/179, 184, 310/189, 216, 254, 259; 318/720, 724, 727, 254, 259

(56) References Cited

U.S. PATENT DOCUMENTS

| 3,596,158 | A | * | 7/1971 | Watrous ..................... 318/809 |
| 3,984,750 | A |   | 10/1976 | Pfeffer et al. |
| 4,030,009 | A | * | 6/1977 | Halsted ....................... 318/772 |
| 5,227,710 | A | * | 7/1993 | Lewus ......................... 318/781 |
| 6,252,325 | B1 | * | 6/2001 | Nashiki ....................... 310/168 |
| 6,329,783 | B1 | * | 12/2001 | Vrionis et al. ............... 318/772 |
| 6,359,800 | B1 |   | 3/2002 | Liang et al. |
| 6,493,924 | B2 |   | 12/2002 | Das |

FOREIGN PATENT DOCUMENTS

WO    WO 98/08291    2/1998

* cited by examiner

*Primary Examiner*—Thanh Lam
(74) *Attorney, Agent, or Firm*—McDermott Will & Emery LLP

(57) ABSTRACT

Reconfiguration of stator winding sections of each phase of a multiphase motor is controlled for successive ranges of speed during which the motor can be expected to operate to obtain optimum operating efficiency throughout the entire operating range. All winding sections for a stator element are energized throughout the motor operating speed range but connected, through appropriate switches, in different circuit configurations for respective portions of the speed range. The switches are activated by a controller in response to a sensed motor speed signal. The reconfiguration of stator winding sections may be incorporated within a motor control system that is adaptive to control various motor parameters in response to sensed conditions as well as user input commands.

13 Claims, 7 Drawing Sheets

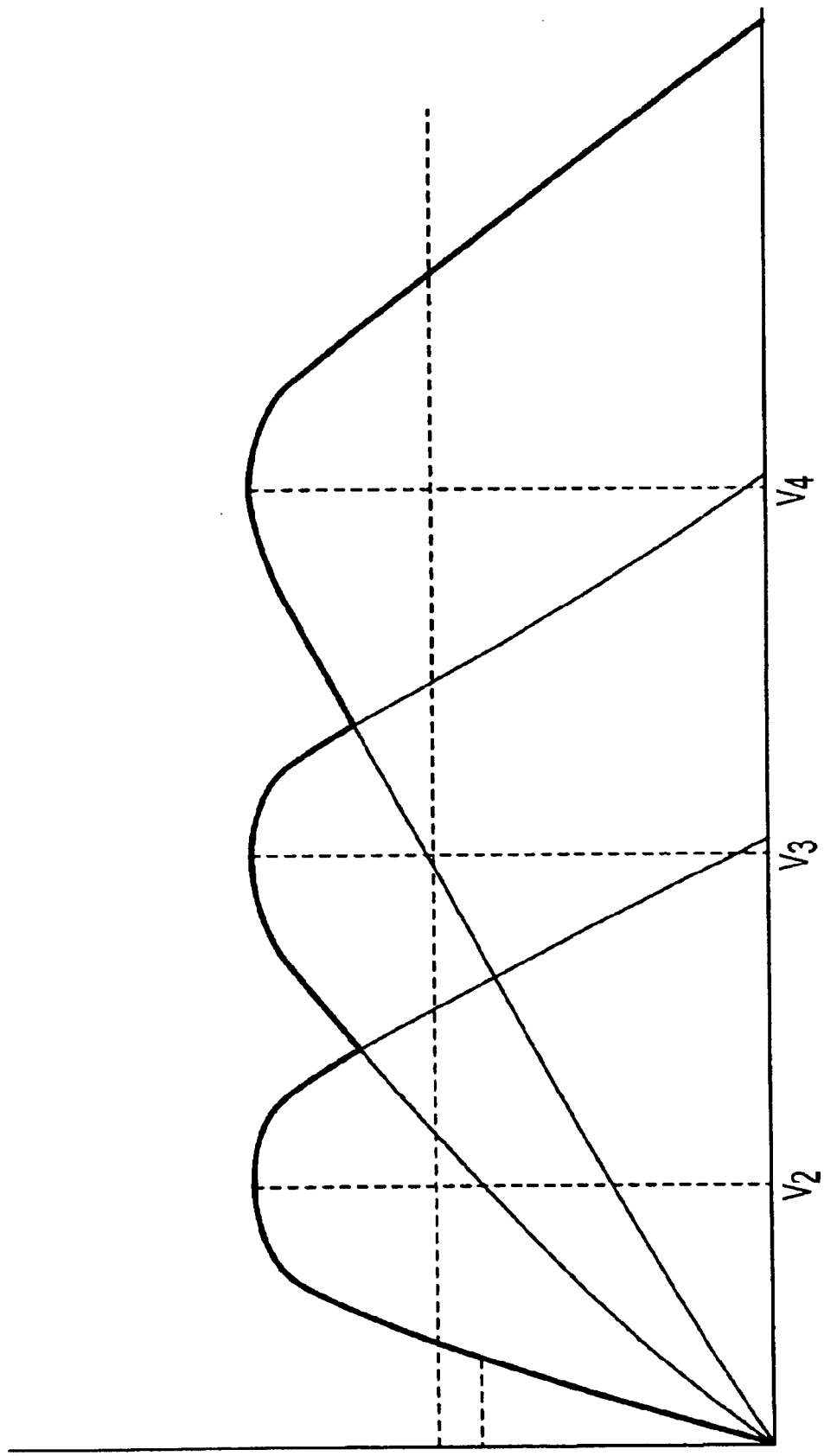

MULTIPHASE MOTOR HAVING DIFFERENT WINDING CONFIGURATIONS FOR RESPECTIVE SPEED RANGES

RELATED APPLICATIONS

This application contains subject matter related to copending U.S. application Ser. No. 09/826,423 of Boris Maslov et al., filed Apr. 5, 2001, copending U.S. application Ser. No. 09/826,422 of Boris Maslov et al., filed Apr. 5, 2001, copending U.S. application Ser. No. 10/173,610 of Boris Maslov et al., filed Jun. 19, 2002, U.S. application Ser. No. 10/290,505, of Boris Maslov et al., filed Nov. 8, 2002, U.S. application Ser. No. 10/352,897, of Alexander Gladkov, filed Jan. 29, 2003, and U.S. application Ser. No. 10/352,896, of Alexander Gladkov, filed Jan. 29, 2003, all commonly assigned with the present application. The disclosures of these applications are incorporated by reference herein.

FIELD OF INVENTION

The present invention relates to the control of a multiphase motor, more particularly to the reconfiguration of each stator phase winding to provide different circuit connections of sections thereof for energization in respective portions of the motor operational speed range, thereby extending the range of optimal efficiency.

BACKGROUND

The progressive improvement of electronic systems, such as microcontroller and microprocessor based applications for the control of motors, as well as the availability of improved portable power sources, has made the development of efficient electric motor drives for vehicles, as a viable alternative to combustion engines, a compelling challenge. Electronically controlled pulsed energization of windings of motors offers the prospect of more flexible management of motor characteristics. By control of pulse width, duty cycle, and switched application of a battery source to appropriate stator windings, high functional versatility can be achieved.

The above-identified copending related U.S. patent application of Maslov et al., Ser. No. 09/826,423, identifies and addresses the need for an improved motor amenable to simplified manufacture and capable of efficient and flexible operating characteristics In a vehicle drive environment, it is highly desirable to attain smooth operation over a wide speed range, while maintaining a high torque output capability at minimum power consumption. The copending related U.S. application incorporates electromagnet poles as isolated magnetically permeable structures configured as segments in an annular ring, relatively thin in the radial direction, to provide advantageous effects. The above identified Maslov et al. applications recognize that isolation of the electromagnet segments permits individual concentration of flux in each magnetic core segment, with virtually no flux loss or deleterious transformer interference effects from flux interaction with other core segments as compared with prior art embodiments. Operational advantages can be gained by configuring a single pole pair as an autonomous electromagnet. Magnetic path isolation of the individual pole pair from other pole pairs eliminates a flux transformer effect on an adjacent group when the energization of the pole pair windings is switched.

The above-identified copending U.S. patent application Ser. No. 10/173,610 is directed to a control system for a multiphase motor having these structural features. A control strategy is described therein that compensates for individual phase circuit characteristics and offers a higher degree of precision controllability with each phase control loop closely matched with its corresponding winding and structure. Control parameters are specifically identified with characteristics of each respective stator phase. Successive switched energization of each phase winding is governed by a controller that generates signals in accordance with the parameters associated with the stator phase component for the phase winding energized.

While the motors described in the above-identified applications provide operational advantages, these motors and prior art motors do not exhibit uniformly high efficiency at all speeds within a wide operating speed range, even with non-variable loads. For a fixed motor topology, the available magnetomotive force (MMF) is dependent upon the number of winding turns and energization current. The term "motor topology" is used herein to refer to physical motor characteristics, such as dimensions and magnetic properties of stator cores, the number of coils of stator windings and wire diameter (gauge), etc. The available magnetomotive force dictates a variable, generally inverse, relationship between torque and speed over an operating range. An applied energization current may drive the motor to a nominal operating speed. As the motor accelerates toward that speed, the torque decreases, the current drawn to drive the motor decreases accordingly, and thus efficiency increases to a maximum level. As speed increases beyond the nominal speed, additional driving current is required, thereby sacrificing efficiency thereafter. Thus, efficiency is variable throughout the speed range and approaches a peak at a speed well below maximum speed.

Motors with different topologies obtain peak efficiencies at different speeds, as illustrated in FIG. 1. This figure is a plot of motor efficiency versus operating speed over a wide speed range for motors having different topologies. The topologies represented in this figure differ solely in the number of stator winding turns. Each efficiency curve approaches a peak value as the speed increases from zero to a particular speed and then decreases toward zero efficiency. Curve A, which represents the motor with the greatest number of winding turns, exhibits the steepest slope to reach peak efficiency at the earliest speed V2. Beyond this speed, however, the curve exhibits a similarly steep negative slope. Thus, the operating range for this motor is limited. The speed range window at which this motor operates at or above an acceptable level of efficiency, indicated as X% in FIG. 1, is relatively narrow.

Curves B through E represent motors with successively fewer winding turns. As the number of winding turns decreases, the motor operating speed for maximum efficiency increases. Curve B attains peak efficiency at speed V3, Curve C at V4, Curve D at V5 and Curve E at V6. Each motor has peak efficiency at a different motor operating speed, and none has acceptable efficiency over the entire range of motor operating speeds.

In motor applications in which the motor is to be driven over a wide speed range, such as in a vehicle drive environment, FIG. 1 indicates that there is no ideal single motor topology that will provide uniformly high operating efficiency over the entire speed range. For example, at speeds above V6 curves A and B indicate zero efficiency. At the lower end of the speed range, for example up to V2, curves C through E indicate significantly lower efficiency than curves A and B.

For motor vehicle drives, operation efficiency is particularly important as it is desirable to extend battery life and thus the time period beyond which it becomes necessary to recharge or replace an on-board battery. The need thus exists for motors that can operate with more uniformly high efficiency over a wider speed range than those presently in use. This need is addressed in the above identified Maslov et al. Application ('030). The approach taken therein is to change, on a dynamic basis, the number of active coils of each stator winding for each of a plurality of mutually exclusive speed ranges between startup and a maximum speed at which a motor can be expected to operate. The speed ranges are identified in a manner similar to that illustrated in FIG. 1 and a different number of the motor stator winding coils that are to be energized are designated for each speed range to obtain maximum efficiency for each of a plurality of operating speed ranges. The number of energized coils are changed when the speed crosses a threshold between adjacent speed ranges. Each winding comprises a plurality of individual, serially connected, coil sets separated by tap connections. Each respective tap is connected by a switch to a source of energization during a single corresponding speed range. The windings thus have a different number of energized coils for each speed range.

Another approach is described in the above-identified copending Gladkov Applications ('053 and '058). Each stator phase winding is configured with a topology different from the topology of each of the other phase windings. Winding topology is characterized by the total number of coil turns in each phase winding and the wire gauge of the coils in each phase winding. Each phase winding differs from each of the other phase windings by the total number of coil turns or by wire gauge, preferably in both respects. With the gauge sizes and total number of coil turns of the phase windings being in inverse relationship with respect to each other, all of the phase windings are provided with substantially the same total coil mass. Phase winding energization can be tailored to obtain maximum efficiency in each of several operating speed ranges from startup to the maximum speed at which a motor can be expected to operate. For a machine structure that accommodates a large number of phases, it is necessary to predefine, for each speed range, which phase windings are to have no voltage applied as well as to identify what predefined voltage magnitude is to be applied to each of the remaining phase windings. The number, and identity, of the phase windings that are to be energized, as well as the magnitude of the individually applied predefined voltages, may differ for each speed range. The predefined optimal voltages should be applied on a dynamic basis in accordance with the sensed speed of the motor. While the predefined voltages for the phase windings can be derived to provide optimal efficiency over the entire motor operating speed range for a given torque, many motor applications exist which require control for variable motor speed, such as in motor vehicles. Motor output torque should be adjusted in accordance with a user's input command that is related to desired speed.

There continues to be a need for optimizing efficiency throughout the operating speed range and for simplifying control of phase winding voltages at variable speed and torque in accordance with user command.

DISCLOSURE OF THE INVENTION

The present invention fulfills the above-described needs for controlling, through a plurality of operating speed ranges, a multiphase motor with optimum operating efficiency throughout the entire operating range. The invention is effective when applied to all motor structural configurations including the isolated individual stator core segment constructions of the above discussed Maslov et al. applications. Advantages are obtained, at least in part, by dividing each stator segment winding into a plurality of winding sections that are coupled to each other through switches. All winding sections are energized throughout the motor operating speed range but connected, through appropriate ones of the switches, in different circuit configurations for respective portions of the speed range. The switches are activated by a controller in response to a sensed motor speed signal to activate switches appropriate for the motor speed range portion corresponding to the sensed motor speed. Thus, a plurality of mutually exclusive sub speed ranges between startup and a maximum speed at which a motor can be expected to operate are identified, and a different configuration for circuit connection of all of the stator winding sections is designated and energized for each sub speed range.

A further advantage of the invention is that the motor winding configurations can be changed on a dynamic basis to adapt the motor for operation with maximum efficiency for each of the sub speed ranges. In addition to the reconfiguration of winding sections in respective speed ranges, the controller can be provisioned to receive at an input port a variable user input signal in response to which the controller can adjust the magnitude of voltage applied by the power source to the winding sections.

Another advantage of the invention is that a plurality of winding section configurations may be implemented by coupling one end of each winding section of a winding in an electrical circuit through at least one of the switches to each of the other winding sections of the same winding. For example, each winding may comprise four winding sections connected in three different circuit configurations respectively in three portions of the motor speed range. The four winding sections can be connected in series in the lowest portion of the speed range, in a series connection of two parallel connected winding sections in an intermediary portion of the speed range, and connected in parallel in the highest portion of the speed range.

Each of the core segments may comprise ferromagnetic material formed to comprise a pair of stator poles. Each stator core segment may be isolated from direct contact with any of the other core segments, the core segments being substantially uniformly spaced around an axis of rotation. Each of the plurality of winding sections for a core segment may be formed on both salient poles of the core segment or formed only on one of the salient poles.

Additional advantages of the present invention will become readily apparent to those skilled in this art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive.

BRIEF DESCRIPTION OF DRAWINGS

The present invention is illustrated by way of example, and not by way of limitation, in the figures of the accompanying drawing and in which like reference numerals refer to similar elements and in which:

FIG. 5 is a plot of motor efficiency versus motor operating speed for an extended operating speed range with winding sections connected as shown in FIGS. 4A–4C.

DETAILED DESCRIPTION OF THE INVENTION

Figure 2:
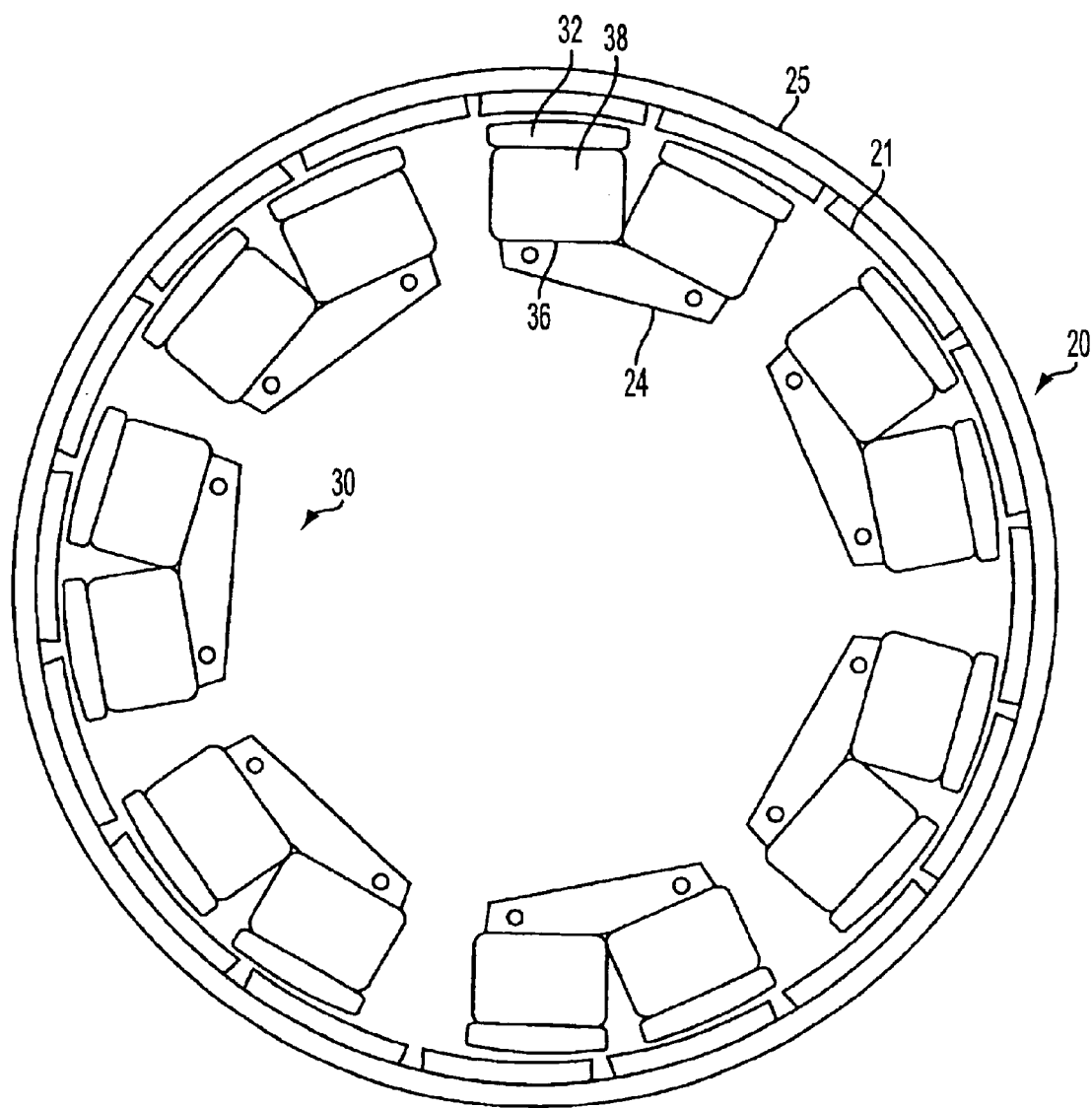
FIG. 2 is an exemplary configuration of rotor and stator elements that may be employed in the present invention.

FIG. 2 is an exemplary configuration of rotor and stator elements that may be employed in the present invention. Reference is made to the above identified copending Maslov et al. application Ser. No. 09/826,422 for a more detail description of the motor exemplified herein. Rotor member 20 is an annular ring structure having permanent magnets 21 spaced from each other and substantially evenly distributed along cylindrical back plate 25. The permanent magnets are rotor poles that alternate in magnetic polarity along the inner periphery of the annular ring. The rotor surrounds a stator member 30, the rotor and stator members being separated by an annular radial air gap. Stator 30 comprises a plurality of electromagnet core segments of uniform construction that are evenly distributed along the air gap.

The stator comprises seven core segments, each core segment formed in a generally u-shaped magnetic structure 36 with two poles having surfaces 32 facing the air gap. The legs of the pole pairs are wound with windings 38, although the core segment may be constructed to accommodate a single winding formed on a portion linking the pole pair. Each stator electromagnet core structure is separate, and magnetically isolated, from adjacent stator core elements. The stator elements 36 are secured to a non-magnetically permeable support structure, thereby forming an annular ring configuration. This configuration eliminates emanation of stray transformer flux effects from adjacent stator pole groups. Appropriate stator support structure, which has not been illustrated herein so that the active motor elements are more clearly visible, can be seen in the aforementioned patent application. It is to be understood that the particular structure in this drawing is merely exemplary, as the motor may comprise a different number of core segments, a different number of poles in each core segment, and/or a different number of rotor magnets than those illustrated.

Figure 3A:
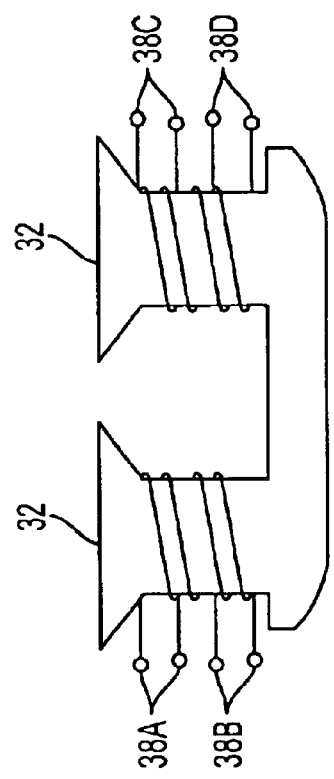
FIG. 3A depicts a stator core segment having winding sections configured in accordance with the present invention.
Figure 3B:
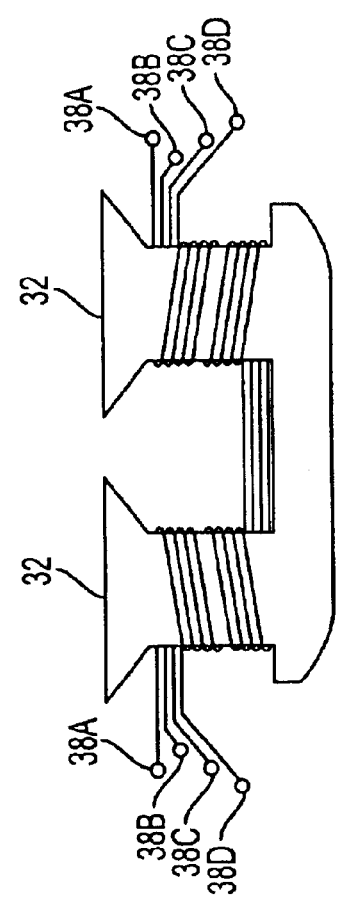
FIG. 3B depicts an alternative stator core segment having winding sections configured in accordance with the present invention.

FIGS. 3A and 3B depict alternative winding formations on a two pole core section such as shown in FIG. 2. Although only a single core segment is shown in each figure, all of the stator core segments are similarly formed. Preferably, the winding of each core segment comprises four sections identified as 38A–38D. Each section has two ends that may be connected to ends of the other sections in various circuit configurations in a manner described hereinafter. In the formation shown in FIG. 3A, each winding section comprises coils wound on both salient poles 32. Thus each section has an end connection point accessible at each pole 32 of the pole pair. FIG. 3A illustrates end connection points 38A–38D at each of the poles. In the formation shown in FIG. 3B, each winding section comprises coils wound on only one of the salient poles 32. As shown, winding sections 38A and 38B are formed on one of the poles and winding sections 38C and 38D are formed on the other pole.

Figure 1:
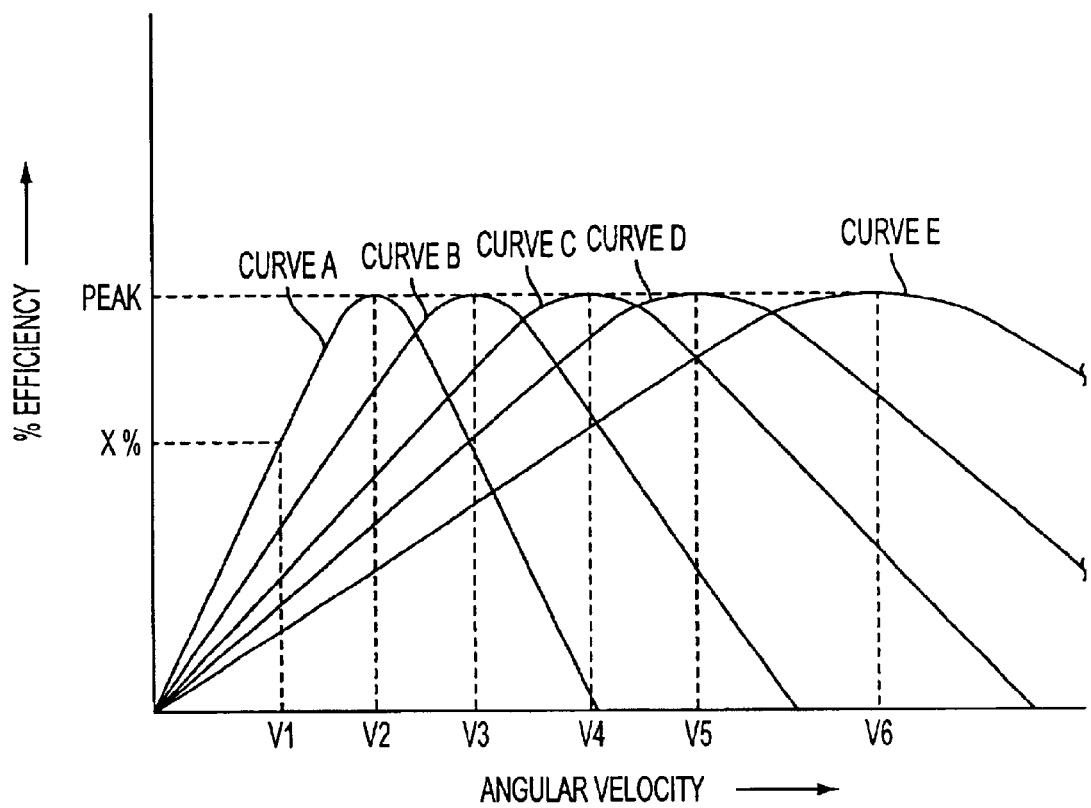
FIG. 1 is a plot of motor efficiency versus motor operating speed over a wide speed range for different conventional motors having different numbers of winding turns.
Figure 4A:
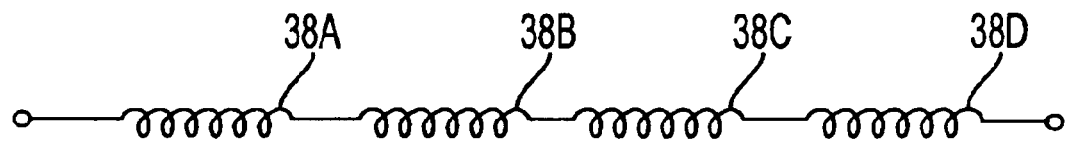
FIG. 4A depicts a circuit connection of the winding sections of a core segment during a first operating speed range.
Figure 4B:
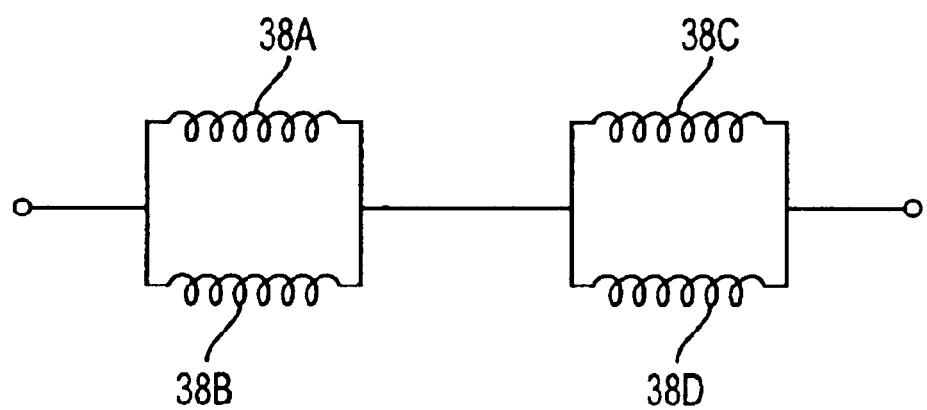
FIG. 4B depicts a circuit connection of the winding sections of a core segment during a second operating speed range.
Figure 4C:
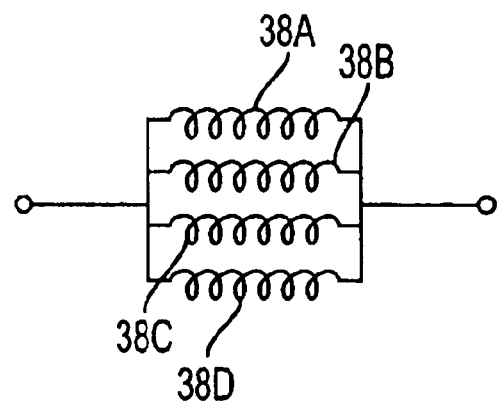
FIG. 4C depicts a circuit connection of the winding sections of a core segment during a third operating speed range.

FIGS. 4A–4C illustrate different circuit configurations of the winding sections 38A–38D of each core segment for respective operating speed ranges, applicable to either of the stators of FIGS. 3A and 3B, whereby optimal efficiency for the motor is obtained in each speed range, as illustrated in FIG. 5. At the start of motor operation and during the lowest speed operating range the four winding sections are connected in series, as shown in FIG. 4A. Operation with this configuration yields an efficiency characteristic similar to curve A of FIG. 1. Efficiency for that curve reaches a peak value at speed V2, the efficiency curve thereafter exhibiting a steep negative slope. As speed increases, a range is approached at which winding sections 38A–38D are reconnected to the configuration of FIG. 4B, in which the parallel connection of winding sections 38A and 38B are connected in series with the parallel connection of winding sections 38C and 38D. The efficiency characteristic for this configuration exhibits a curve similar to curve B of FIG. 1. This curve reaches peak efficiency at a higher speed, depicted as V3 in FIG. 5, than the initial speed curve and has a less steep slope. Preferably, transition from the configuration of FIG. 4A to the configuration of FIG. 4B occurs at the speed at which the respective efficiency curves intersect. If the motor speed continues to increase beyond the peak efficiency of the configuration of the configuration of FIG. 4B, windings sections 38A–38D are reconnected to the configuration of FIG. 4C, in which all winding sections are connected in parallel. The efficiency characteristic for this configuration exhibits a curve similar to curve C of FIG. 1. This curve has a more gradual slope and reaches peak efficiency at a yet higher speed, depicted as V4 in FIG. 5. Transition to the configuration of FIG. 4C preferably occurs at the speed at which the efficiency curves for the two configurations of the transition intersect.

The efficiency characteristic for motor operation with these winding section reconfigurations is represented by the bold curve of FIG. 5. This curve is a composite of the three individual curves and exhibits high efficiency operation over an extended range of speeds, that is not obtainable with only one of the configurations.

Figure 6:
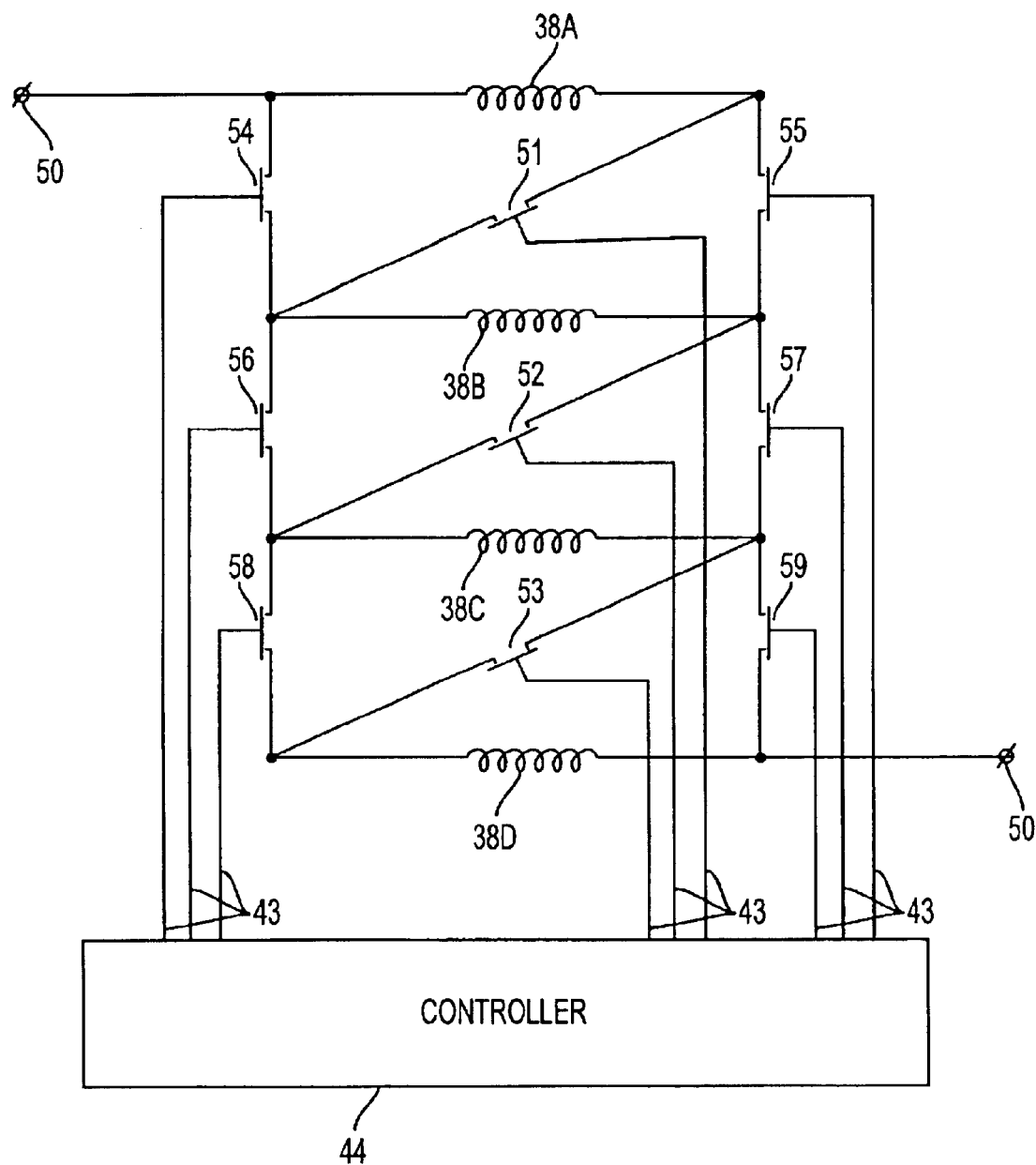
FIG. 6 is a circuit diagram for configuring the winding sections of a core element in the arrangements shown in FIGS. 4A–4C.

A control circuit for effecting the winding section configurations of FIGS. 4A–4C is shown in FIG. 6. The winding sections 38A–38D are coupled between power supply terminals 50 via controllable switches 51–59, which may comprise MOSFETs or other appropriate electronic devices. Switches 51–59 are selectively activated via leads 43 by controller 44. The controller has a motor speed feedback input, not shown in this figure. Although only windings for a single stator core element are shown, it should be understood that the stator may comprise any number of core elements and that the illustrated circuit is applicable to each core element.

A first end of winding section 38A is directly connected to a first supply terminal 50. The second end of winding section 38A is connected to switch 51 which is also connected to a first end of winding section 38B. Switch 55 is connected between the second end of winding section 38A and the second end of winding section 38B. Switch 54 is connected between the first end of winding section 38A and the first end of winding section 38B. Switch 52 is connected between the second end of winding section 38B and a first end of winding section 38C. Switch 57 is connected between the second end of winding section 38B and the second end of winding section 38C. Switch 56 is connected between the first end of winding section 38B and the first end of winding section 38C. Switch 53 is connected between the second end of winding section 38C and a first end of winding section 38D. Switch 59 is connected between the second end of winding section 38C and the second end of winding section 38D. Switch 58 is connected between the first end of winding section 38C and the first end of winding section 38D. The second end of winding section 38D is connected to the other power supply terminal 50.

In operation, at motor startup the controller outputs control signals to those leads 43 that are connected to the control terminals of switches 51, 52 and 53, thereby to connect winding sections 38A–38D in series across the power supply terminals 50. The power supply may regulated by an adaptive control system such as described hereinafter, or any conventional controlled or unregulated motor supply source. As the motor reaches the first speed transition point, which is predetermined in accordance with the efficiency curves exemplified in FIG. 5, the controller changes the application of output control signals to the leads 43 that are connected to the control terminals of switches 52, 54, 55, 58 and 59. With these switches activated, winding sections 38A and 38B are connected in parallel, the combination being connected in series with the parallel connection of winding section 38C and 38D. As the motor reaches the next speed transition point, predetermined per the efficiency curves of FIG. 5, the controller changes the application of output control signals to the leads 43 that are connected to the control terminals of switches 54, 55, 56, 57, 58 and 59. With these switches activated, all of the winding sections 38A–38D are connected in parallel across the power supply terminals.

As indicated above, the reconfiguration of stator winding sections may be incorporated within a motor control system that is adaptive to control various motor parameters in response to sensed conditions as well as user input commands. For example, in a vehicle drive application, the system may respond to a user input command to regulate motor speed accordingly. Such a system, disclosed in the above identified copending Maslov et al. application Ser. No. 10/173,610, dictates the voltage and current profile applied to power supply terminals 50 of FIG. 6.

Figure 7:
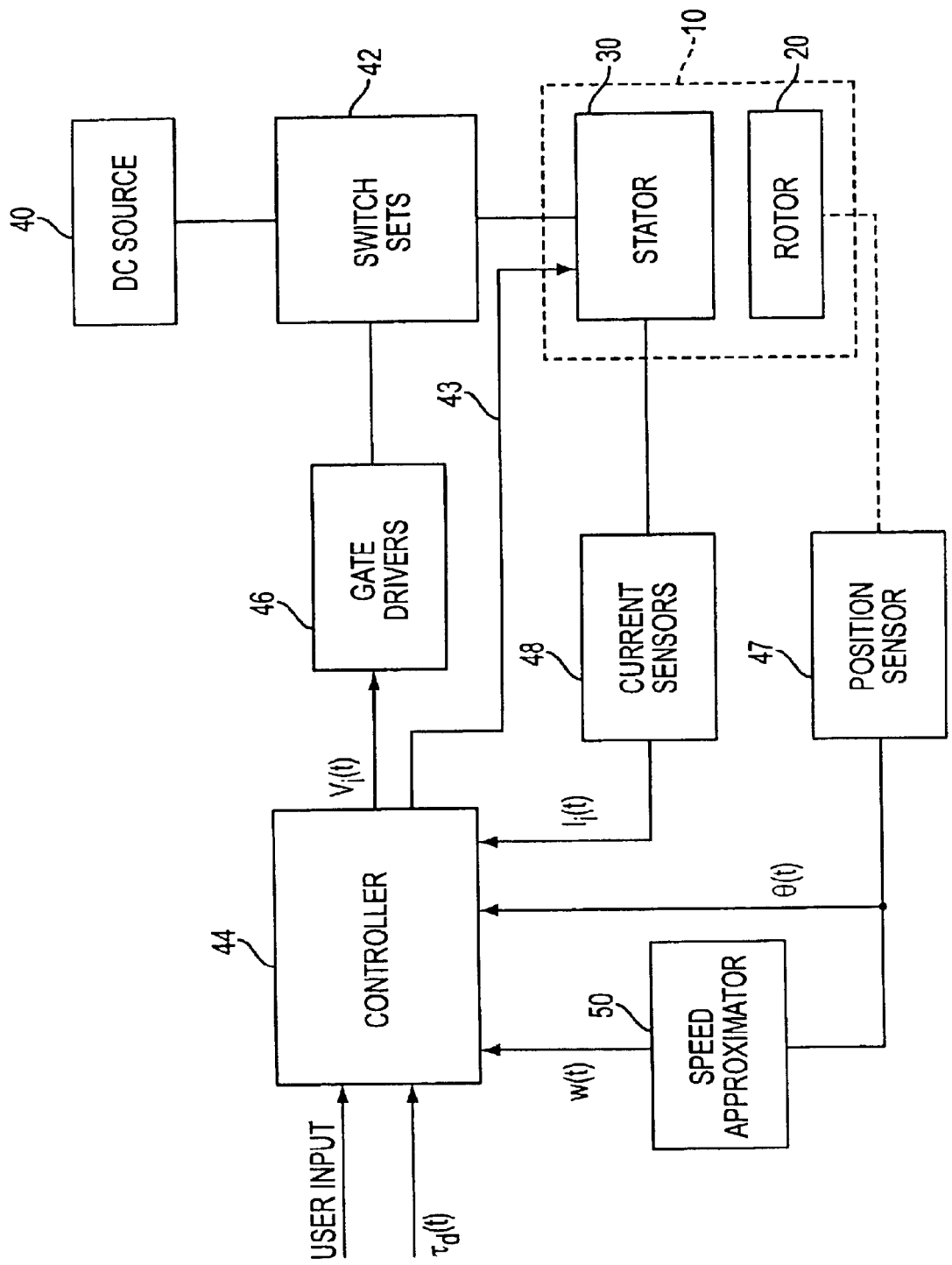
FIG. 7 is a block diagram of a motor control system applicable to the present invention.

FIG. 7 is a block diagram of a motor control system, such as disclosed in the above-identified copending application Ser. No. 10/173,610, and which further comprises the stator winding features and control elements illustrated in FIGS. 3, and 6 for dynamic reconfiguration of stator winding sections according to the present invention. The multiphase motor 10 comprises rotor 20 and stator 30, all shown as blocks. Block 30 may comprise the winding sections 38A–38D and switches 51–59 of FIG. 6 for each stator core element. Each phase of the multiphase motor may correspond to a single core element or a plurality of core elements. Preferably, all the winding sections of all stator core elements are connected by the switches 51–59 in the same configuration in each speed range. These concepts are applicable to any number of phases suitable to design objectives for particular intended drive applications.

Energization current supplied to terminals 50 of the stator windings is derived from d-c power source 40 via electronic switch sets 42. The switch sets are coupled to controller 44 via gate drivers 46. The manner in which these switch sets are controlled is not of particular focus for the present invention. As described more fully in the copending application Ser. No. 10/173,610, controller 44 may have one or more user inputs and a plurality of inputs for motor conditions sensed during operation. Current in each phase winding can be sensed by a respective one of a plurality of current sensors 48 whose outputs are provided to controller 44. The controller may have a plurality of inputs for this purpose or, in the alternative, signals from the current sensors may be multiplexed and connected to a single controller input. Rotor position sensor 47 is connected to another input of controller 44 to provide position signals thereto. The output of the position sensor may also be applied to speed approximator 50, which converts the position signals to speed signals to be applied to another input of controller 44. Alternatively, any conventional motor speed feedback means may be utilized to provide an appropriate motor speed feedback signal to the controller. The copending application specifically identifies commonly available products that are suitable for each of these elements represented in the figure. Line 43 in this figure represents the plurality of connections between the controller and each of the switches 51–59 for the stator end connections.

In operation, the controller 44 is responsive to the various inputs, including the motor speed to provide appropriate waveforms through switch sets 42 to terminals 50 of each stator core element or phase. The controller is also responsive to motor speed to activate, through lines 43, the appropriate switches of switches 51–59 to configure the connection of winding sections to correspond to the respective speed range that comprises the sensed motor speed. This operation provides the benefits of extending the operable motor speed range as well as increasing operating efficiency to optimal values throughout the speed range.

In this disclosure there are shown and described only preferred embodiments of the invention and but a few examples of its versatility. It is to be understood that the invention is capable of use in various other combinations and environments and is capable of changes or modifications within the scope of the inventive concept as expressed herein. For example, stator core element windings may be divided into a different number of sections and designed to be reconfigured in other circuit arrangements for respective sub speed ranges that define a different number of transitions. In addition, reconfiguration of stator winding sections can provide similar benefits for motors having continuous magnetic stator cores.

What is claimed is:

1. An apparatus comprising:
  a plurality of electric motor stator core segments, each core segment formed with a pair of salient poles;
  a plurality of switches; and
  a winding formed on stator each core segment, the winding divided into a plurality of winding sections coupled to each other through the switches;
  wherein all winding sections are connected via selected ones of the switches in an electrical circuit to a power source for energizing all of the winding sections of the motor throughout a motor operational speed range and, during different portions of the operational speed range, the winding sections are connected in different respective circuit configurations.

2. An apparatus as recited in claim 1, further comprising a controller coupled to each of the switches; and a motor speed sensor for providing a sensed motor speed signal to the controller;

wherein the controller is responsive to the sensed motor speed signal to activate respective ones of the switches for the motor speed range portion corresponding to the sensed motor speed.

3. An apparatus as recited in claim 1, wherein one end of each winding section of a winding is coupled in an electrical circuit through at least one of the switches to each of the other winding sections of the same winding.

4. An apparatus as recited in claim 3, wherein each winding comprises four winding sections connected in three different circuit configurations respectively in three portions of the motor speed range.

5. An apparatus as recited in claim 4, wherein the four winding sections are connected in series in the lowest portion of the speed range, in a series connection of two parallel connected winding sections in an intermediary portion of the speed range, and connected in parallel in the highest portion of the speed range.

6. An apparatus as recited in claim 3, wherein the controller comprises a user input port for receiving a variable input signal; and the controller adjusts the magnitude of voltage applied by the power source to the winding sections in response to a user command signal received at the user input port.

7. An apparatus as recited in claim 1, wherein each of the core segments comprises ferromagnetic material that is isolated from direct contact with any of the other core segments and the core segments are substantially uniformly spaced around an axis of rotation.

8. An apparatus as recited in claim 1, wherein each of the plurality of winding sections is formed on both salient poles of a respective core segment.

9. An apparatus as recited in claim 1, wherein each of the plurality of winding sections is formed only on one of the salient poles of a respective core segment.

10. In a motor comprising a plurality of stator core segments, each core segment having a pair of salient poles with a plurality of winding sections formed thereon, a method comprising the steps of:

connecting the winding sections of each respective core segment in a first circuit configuration;

applying energization to all of the winding sections while connected in the first circuit configuration;

sensing the speed of the motor;

reconnecting the winding sections of each respective core segment in a second circuit configuration when the motor speed is within a predetermined range of motor operation; and energizing all of the winding sections while connected in the second circuit configuration.

11. A method as recited in claim 10, further comprising the steps of:

inputting a signal representing desired motor torque output; and adjusting the magnitude of voltage applied to the winding sections in each configuration in accordance with the signal input in the inputting step.

12. A method as recited in claim 10, further comprising the steps of:

reconnecting the winding sections of each respective core segment in a third circuit configuration when the motor speed is within another predetermined range of motor operation; and energizing all of the winding sections while connected in the third circuit configuration.

13. A method as recited in claim 12, wherein all windings of each respective core segment are connected in series in the first circuit configuration and in parallel in the third circuit configuration.

* * * * *